April 21, 1931.  H. C. PHILLIPS  1,802,216
ROAD SURFACING MACHINE
Filed Sept. 20, 1929   4 Sheets-Sheet 4
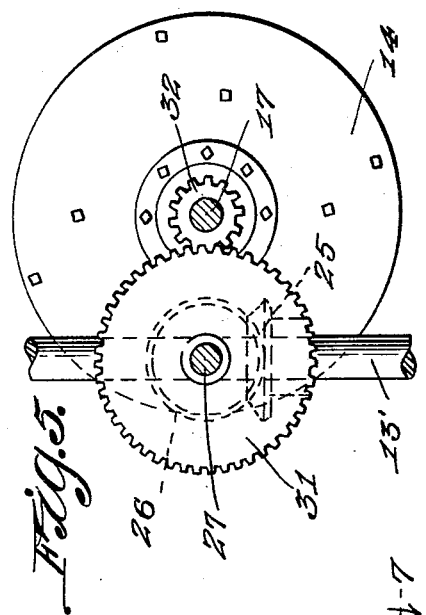
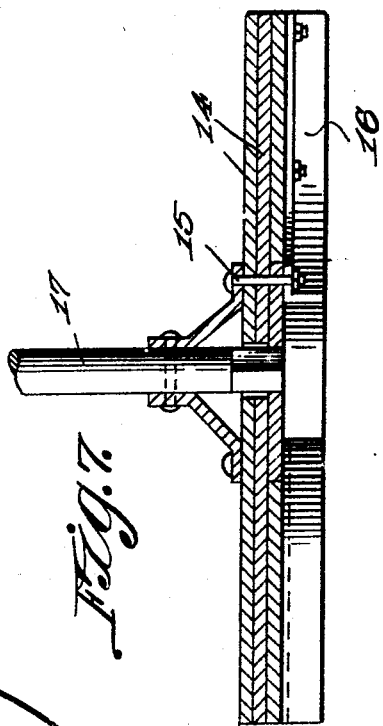
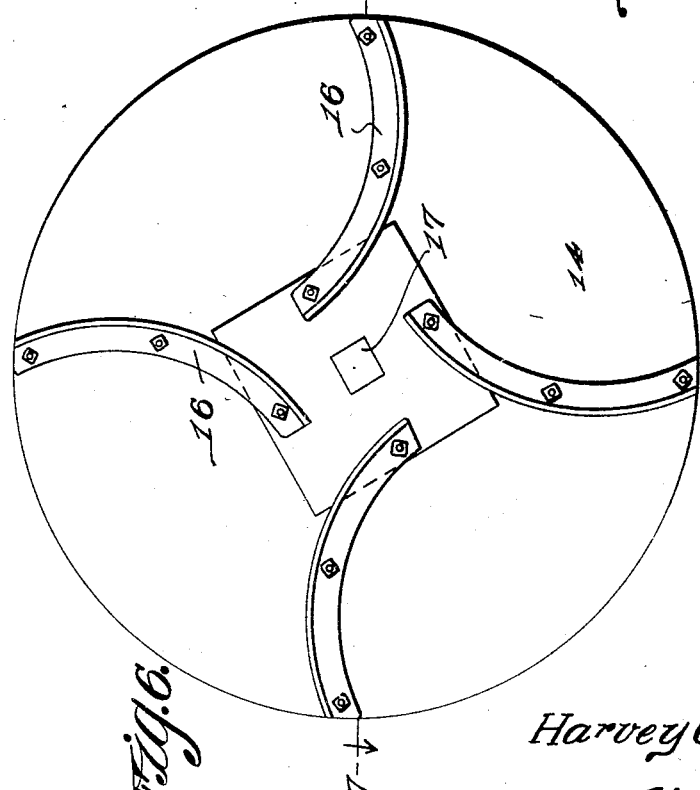
Harvey C. Phillips,
INVENTOR
BY Victor J. Evans
ATTORNEY Patented Apr. 21, 1931

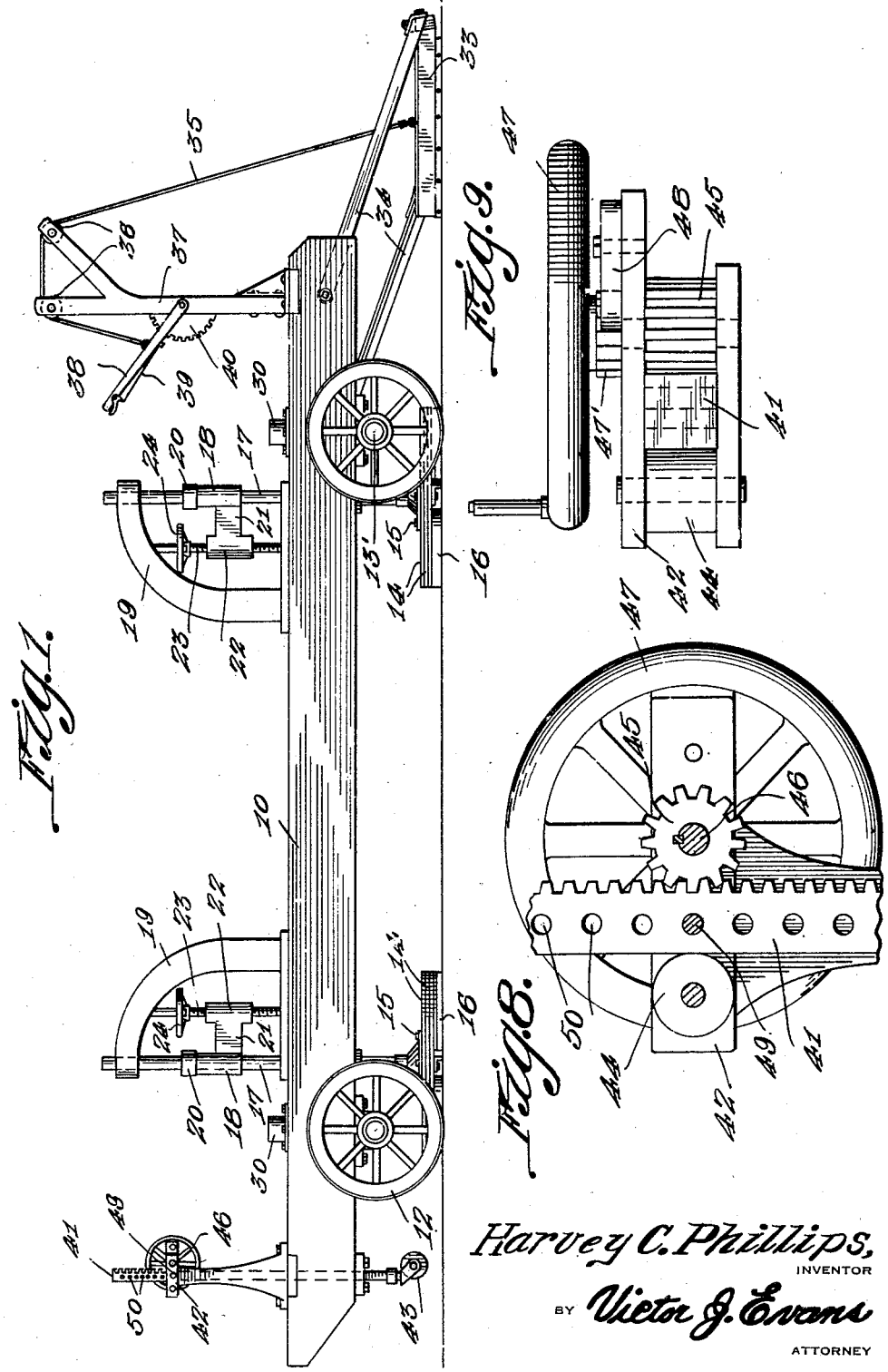

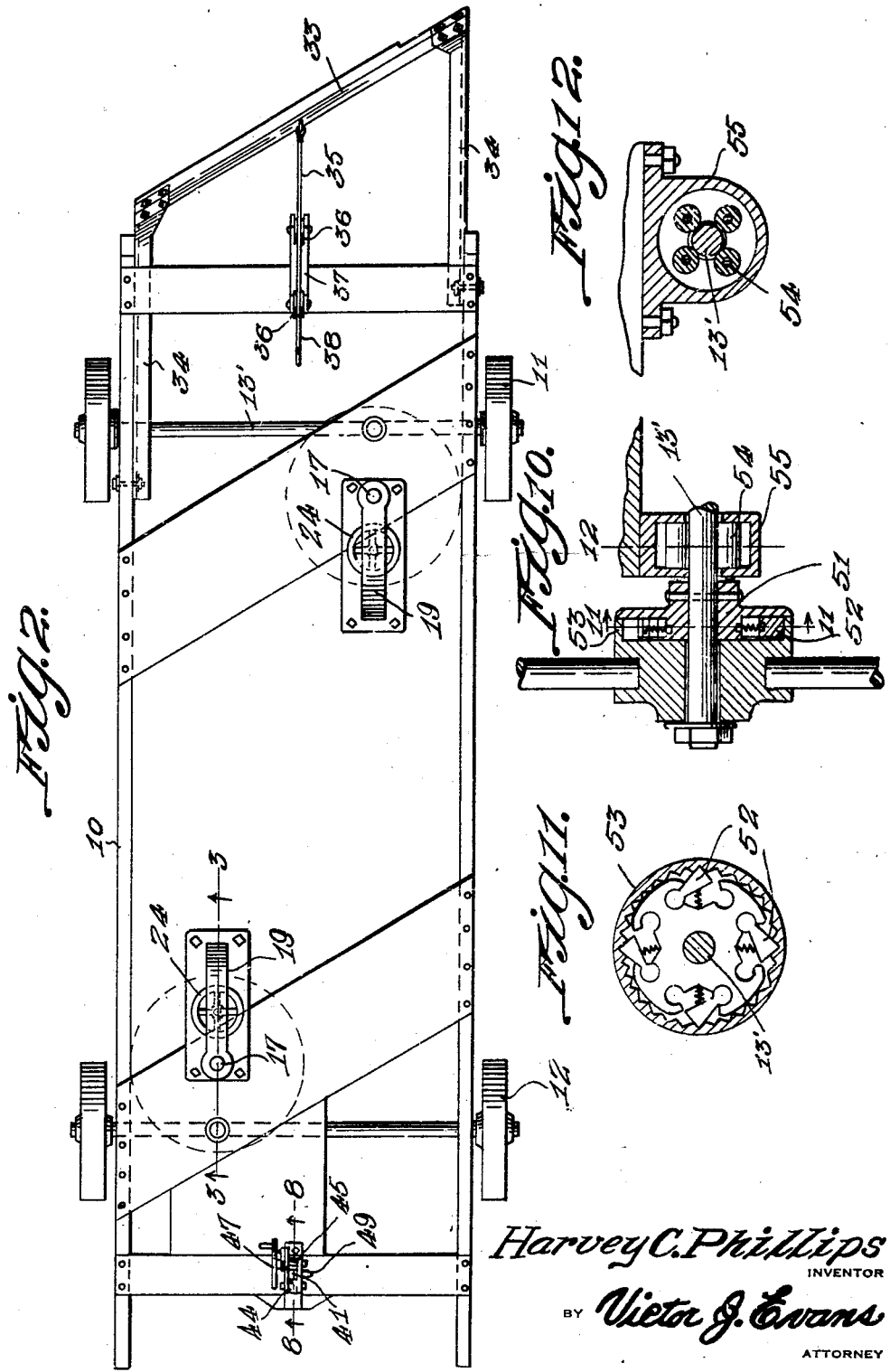

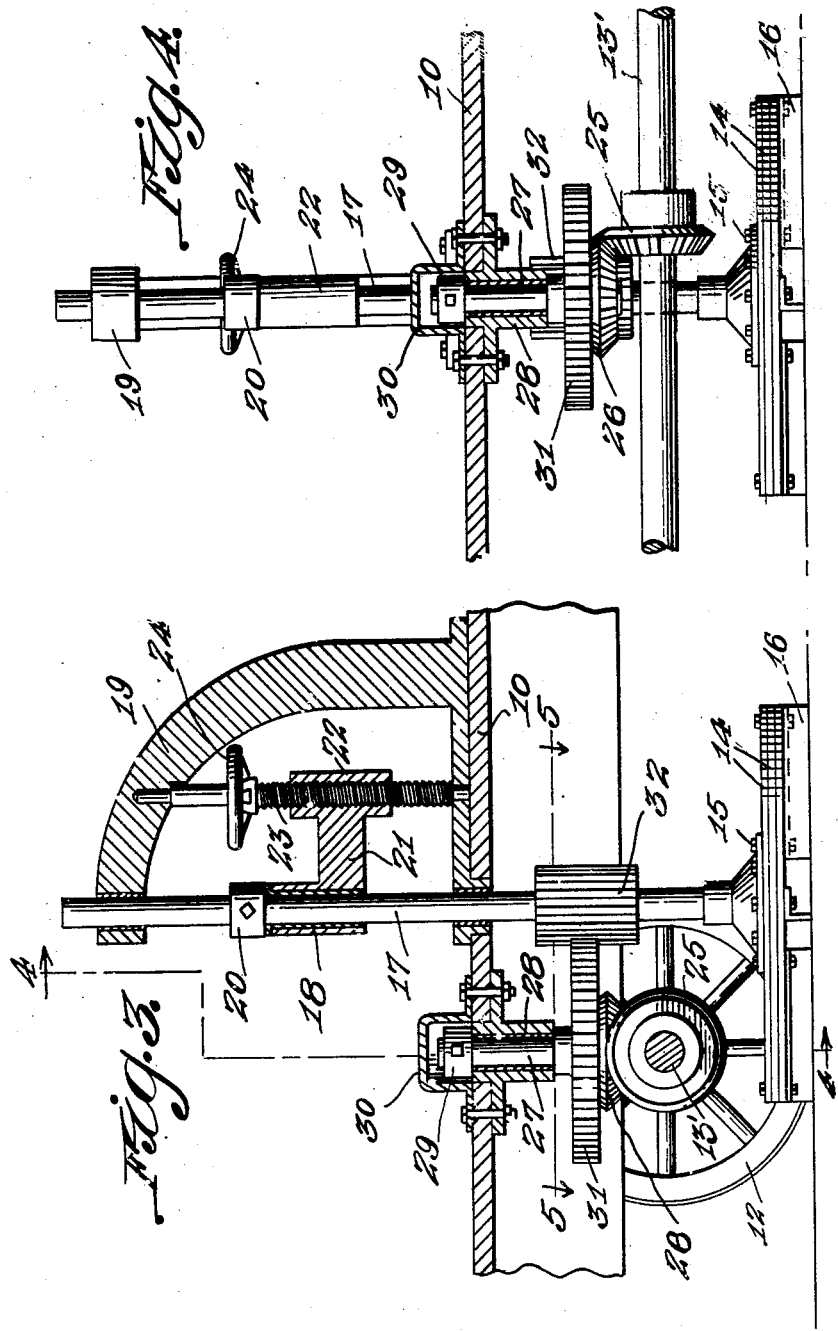

1,802,216

UNITED STATES PATENT OFFICE

HARVEY C. PHILLIPS, OF ARCADIA, INDIANA

ROAD-SURFACING MACHINE

Application filed September 20, 1929. Serial No. 393,984.

This invention contemplates the provision of a road surfacing and leveling machine, and resides in the novel construction, combination and arrangement of parts, hereinafter described and more particularly claimed.

In the drawings forming part of this application like numerals of reference indicate similar parts in the several views and wherein:

Figure 1 is a side elevation of the machine.

Figure 2 is a top plan view.

Figure 3 is a sectional view on line 3—3 of Figure 2.

Figure 4 is a sectional view on line 4—4 of Figure 3.

Figure 5 is a sectional view on line 5—5 of Figure 3.

Figure 6 is a bottom plan view of one of the scrapers.

Figure 7 is a sectional view on line 7—7 of Figure 6.

Figure 8 is a sectional view on line 8—8 of Figure 2.

Figure 9 is a plan view of the structure illustrated in Figure 8.

Figure 10 is a sectional view through one of the rear wheels showing its mounting.

Figure 11 is a sectional view on line 11—11 of Figure 10.

Figure 12 is a sectional view on line 12—12 of Figure 10.

Referring to the drawings in detail 10 indicates the body of the machine which is in the nature of a platform mounted on ground wheels 11 and 12 respectively. The machine in its entirety may be propelled in any suitable manner, but is preferably attached to a tractor or the like.

Mounted adjacent the forward and rearward end of the machine are scraper disks, adapted to be rotated in opposite directions by the shafts 13' for the adjacent ground wheels as clearly illustrated in Figures 3 and 4. Each of these disks is preferably constructed of a plurality of superimposed sections 14 which are bolted or otherwise suitably connected together as at 15, while arranged on the under side of each disk is a plurality of curved blades 16 clearly illustrated in Figure 6. Each disk is mounted on the lower end of a vertically disposed shaft 17, and this shaft projects upwardly through the platform 10 and is journaled in a sleeve-like bearing 18 and also in the adjacent end of a curved bracket arm 19 which rises from the platform as clearly shown in Figure 3. Each shaft 17 is provided with a collar 20 which reposes upon the upper end of the sleeve-like bearing 18, this bearing being supported by an arm 21 which provides a connection between the bearing 18 and an internally threaded sleeve 22. Passed through the sleeve 22 is an adjusting screw 23 which has its lower end bearing against the platform 10, and its upper end journaled in the bracket arm 19. This screw is operated by means of a hand wheel 24, and is utilized to raise the scraper disk above the ground as the occasion may require. Manifestly by turning the screw 23 in one direction, the sleeves 18 and 22 respectively, as a unit are moved upwardly, and as the collar 20 carried by the shaft 17 reposes upon the sleeve 18, the said shaft 17 together with its scraper disk is simultaneously elevated above the ground.

While the scraper disks may be rotated in any suitable manner, they are preferably operated from the adjacent axles or shafts 13' for the ground wheels, and as illustrated in Figure 4 each shaft 13' is provided with a bevel gear 25 which meshes with a similar gear 26 carried by a stub shaft 27. Each stub shaft is journaled in a bushing 28 secured to and depending from the platform 10, while each stub shaft is supported within its bushing by means of a collar 29 as clearly illustrated in Figures 3 and 4. Enclosing each collar is a cap 30 which is secured to the platform in any suitable manner, and employed to prevent dirt or other foreign matter from gaining access to the stub shaft 27 and its bearing. Also carried by the stub shaft, and arranged directly above the bevel gear 26 is the gear 31 which meshes with a pinion 32 secured to the shaft 17 of the adjacent scraper disk. It will be noted upon inspection of Figure 3 that the pinion 32 is elongated, so that the scraper disk can be adjusted toward and away from the ground, without moving the pinion 32 out of engagement with the gear 31. It will be further observed from an inspection of Figure 1 that the shafts 17 for the respective scraper disks are arranged adjacent the inner sides of the shafts 13', so that when the machine is moved over the surface, the scraper disks will be rotated in opposite directions.

Supported from the rear end of the machine is a leveling device indicated generally at 33, the latter being supported by spaced parallel arms 34 which are pivoted upon the machine, so that the leveling device can be raised or lowered with relation to the ground when desired. For this purpose I employ a cable 35, the lower end of which is attached to the leveling device, the cable being trained over guide pulleys 36 supported on the upper end of a standard 37 and has its opposite end attached to a lever 38. The lever is equipped with a pawl 39 which cooperates with a ratchet wheel 40, so that the leveling device may be supported in its elevated position.

At the forward end of the machine I employ a vertically adjustable rack bar 41 which operates in a suitable guide 42, the lower end of the rack bar supporting a caster 43. Mounted in the guide 42 is a roller 44 which engages the adjacent edge of the rack bar, to hold it in mesh with a pinion 45 mounted on a shaft 46 which is also journaled in the guide 42. The shaft 46 is rotated through the instrumentality of a hand wheel 47 for the purpose of either raising or lowering the rack bar 41, and when the rack bar is lowered to bring the caster 43 into contact with the ground the adjacent end of the machine is elevated, spacing the scraping disk and ground wheels 12 from the ground, so that the machine can be conveniently guided and returned to the desired course as the occasion may require. The shaft 46 is also provided with a ratchet wheel 47' with which cooperates a pawl 48 to hold the rack bar in its given adjusted position, until a locking pin 49 is passed through one of the openings 50 in the rack bar and also through the guide 42, to maintain the caster 43 in engagement with the ground.

The rear ground wheels 11 are preferably mounted upon their shaft or axle 13' in the manner illustrated in Figures 10 to 12 inclusive, so that the machine can be conveniently turned as will be readily understood. For this purpose, the shaft 13' has secured thereto adjacent each wheel a hub-like portion 51 upon which is supported a plurality of spring pressed pawls 52 cooperating with the internal teeth formed on a ring 53 formed integral with hub of wheel 11, which of course allows one wheel to rotate slightly faster than the other in turning the machine as will be appreciated. The shaft 13' is also journaled between suitable roller bearings 54 arranged in a suitable casting 55 secured in any suitable manner to the under side of the platform 10.

In practice, the machine is moved over the ground or surface, and incident to the rotation of the axles or shafts 13' of the ground wheels, the shafts 17 of the scraper disks are rotated in opposite directions. The leveling device aranged at the rear of the machine follows the course pursued by these scraper disks so as to level the surface being dealt with, although the leveling device can be held supported in spaced relation to the ground at the will of the operator. Should the machine move out of the desired course, it is only necessary to lower the caster 43 into contact with the ground, raising the forward end of the machine, until the latter is returned to the proper course, after which the caster is elevated and the adjacent end of the machine again lowered into contact with the ground. The entire machine can be very quickly and conveniently manipulated, and accomplishes the desired results in a highly efficient and expeditious manner.

While it is believed that from the foregoing description, the nature and advantages of the invention will be readily apparent, I desire to have it known that I do not limit myself to what is herein shown and described and that such changes may be resorted to when desired as fall within the scope of what is claimed.

What is claimed is:

1. In a machine of the character described, a wheeled frame, scraper disks depending therefrom and mounted for rotation, curved blades carried by each disk, means for independently adjusting each disk toward and away from the ground, means for simultaneously rotating said disks in opposite directions, incident to the movement of the machine over the surface, adjustable ground engaging means mounted on one end of the machine and utilized for raising said end from the ground and a leveling device arranged at the rear of the machine and adjustably mounted thereon.

2. In a machine of the character described, a wheeled frame, scraper disks depending therefrom and mounted for rotation, means for independently adjusting said disks toward and away from the ground, curved blades carried by each disk, means for simultaneously rotating said disks in opposite directions incident to the movement of the machine over the surface, and adjustable ground engaging means mounted on one end of the machine and utilized for raising said end from the ground for the purpose specified.

3. In a machine of the character described, a wheeled frame, scraper disks depending therefrom and mounted for rotation, means for simultaneously rotating said disks in opposite directions, incident to the movement of the machine over the surface, curved blades carried by each disk, means for independently adjusting said disks toward and away from the ground, adjustable means supported on one end of the machine and including a ground engaging caster for elevating said end of the machine above the ground, and means for locking the last mentioned means in its given adjusted position.

4. In a machine of the character described, a frame, ground wheels supporting said frame, pawl and ratchet mechanism associating certain of said wheels with the frame, to permit turning of the machine, scraper disks depending from the machine and mounted for rotation, curved blades carried by each disk, means for simultaneously rotating said disks in reverse directions incident to the travel of the machine over the surface, and means for independently adjusting said disks toward and away from the ground.

In testimony whereof I affix my signature.

HARVEY C. PHILLIPS.